Dec. 8, 1959     A. Y. DODGE     2,916,024
VARIABLE SPEED DRIVE
Filed Sept. 3, 1957     3 Sheets-Sheet 1
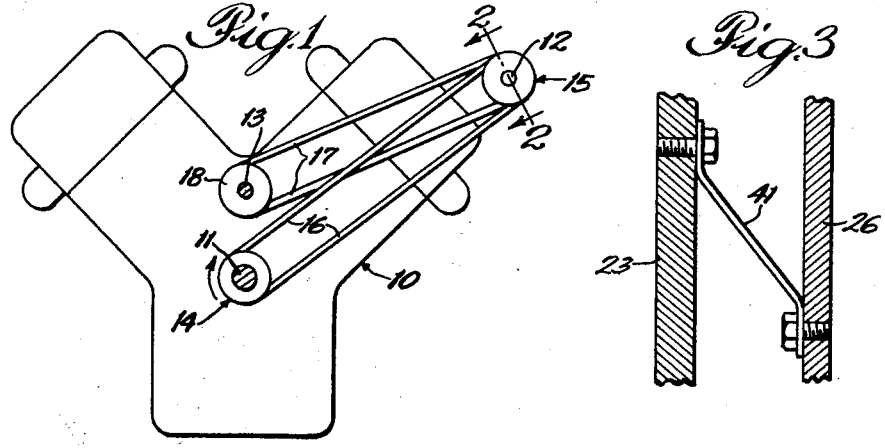
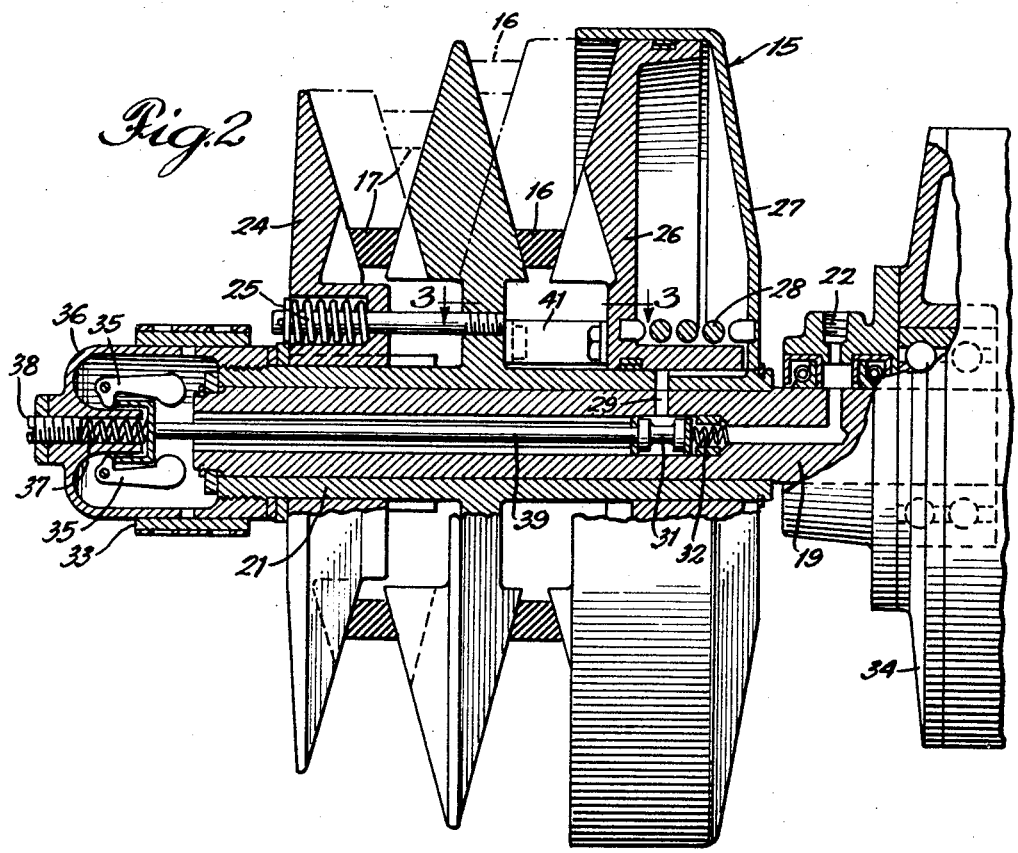
INVENTOR:
Adiel Y. Dodge,
BY
ATTORNEYS.

Dec. 8, 1959   A. Y. DODGE   2,916,024
VARIABLE SPEED DRIVE
Filed Sept. 3, 1957   3 Sheets-Sheet 2
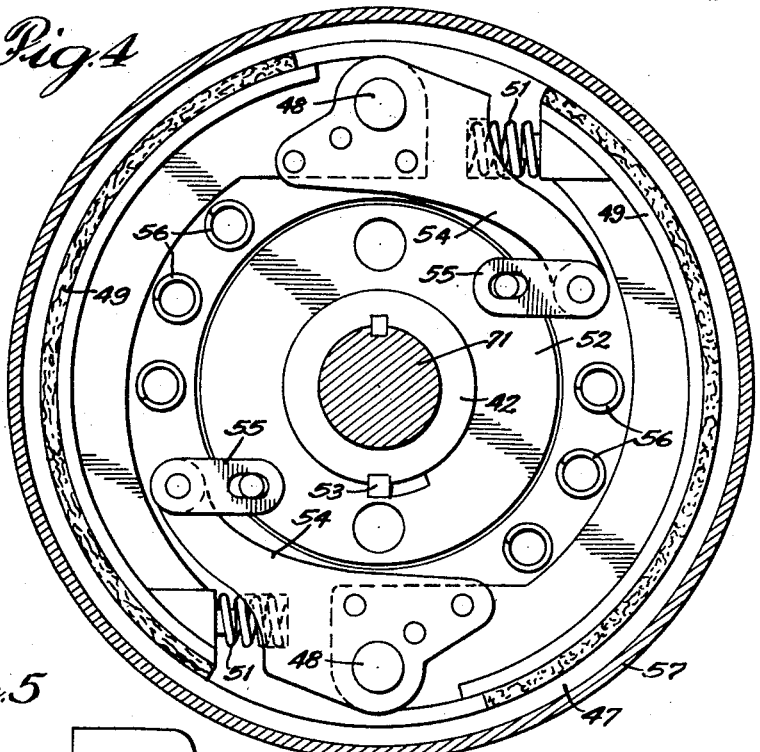
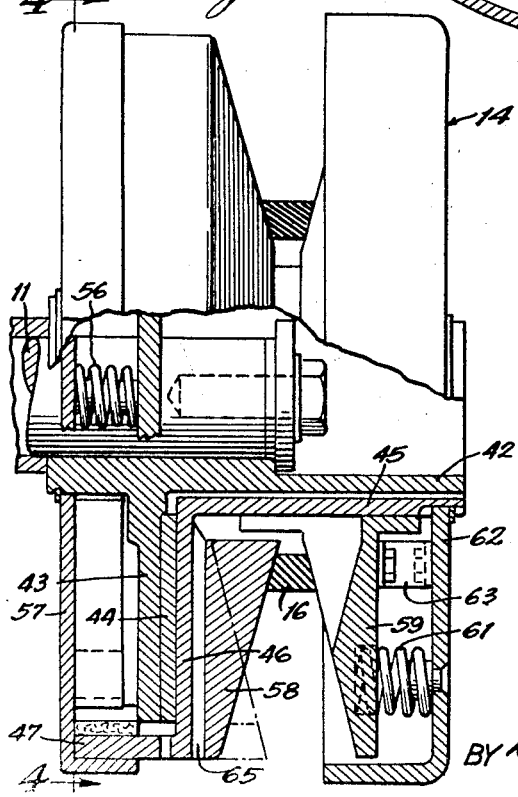
INVENTOR:
Adiel Y. Dodge,
BY Parr Freeman & Molinare
ATTORNEYS.

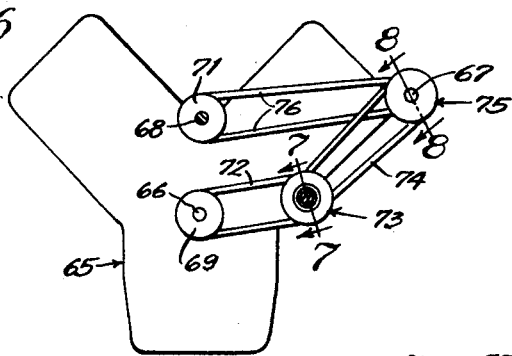
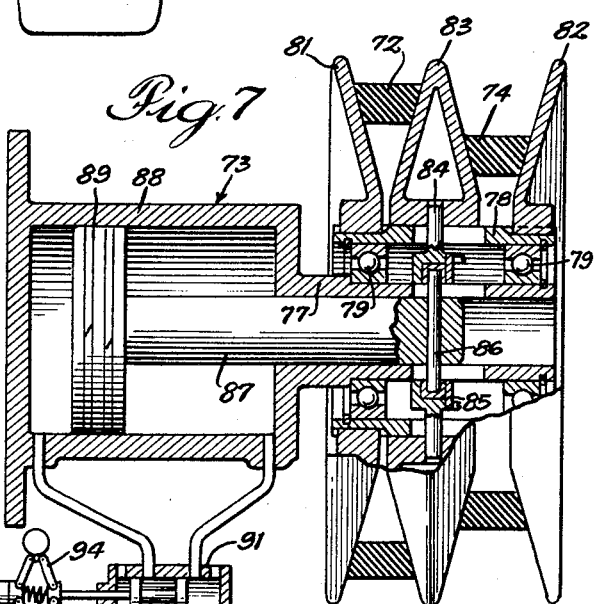
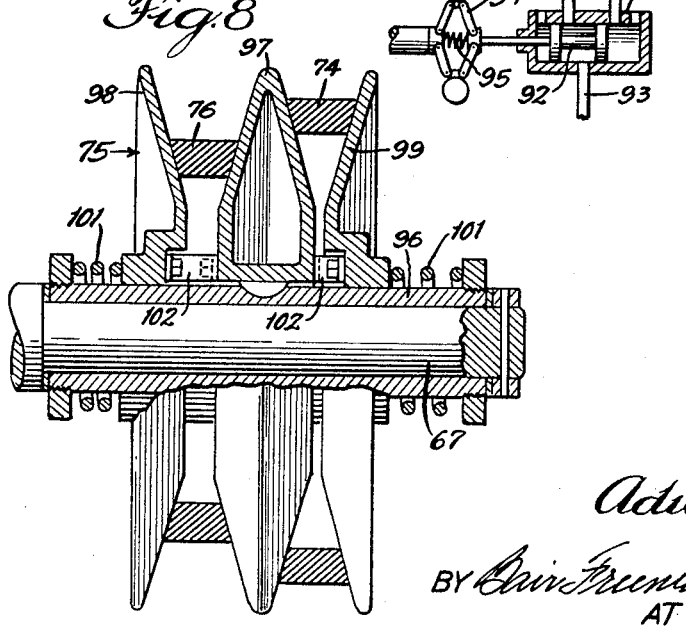

United States Patent Office 2,916,024
Patented Dec. 8, 1959

2,916,024

VARIABLE SPEED DRIVE

Adiel Y. Dodge, Rockford, Ill.

Application September 3, 1957, Serial No. 681,580

7 Claims. (Cl. 123—41.11)

This invention relates to variable speed drives and more particularly to means for driving the fan and accessories of an internal combustion engine.

It has been proposed to use a variable sheave drive for driving the accessories and fan associated with an internal combustion engine to provide a more nearly constant speed for the accessories regardless of wide variations in engine speed and to provide a more nearly constant speed source for driving the fan. One difficulty encountered in such mechanisms results from rapid acceleration and deceleration of the engine which call for very rapid changes in pitch diameters of the sheaves and to cause pinching of the belts. Another problem has been control of the variable sheaves to provide an accessory shaft speed constant within permissible limits.

It is one of the objects of the present invention to provide a variable speed drive in which the effects of rapid accelerations are compensated so that pinching of the belts and other deleterious results are avoided.

Another object is to provide a variable speed drive in which the driving sheave is driven through friction driving means which is responsive to acceleration to reduce the friction upon acceleration.

According to a feature of the invention, the friction driving means include the radially movable friction shoes engageable with an annular drum and a weight connected to the shoes to urge them away from the drum in response to acceleration.

Still another object is to provide a variable speed drive in which both the driving and driven sheaves tend to change their effective diameters in response to torque loads and particularly in response to the high torque loads developed during rapid acceleration.

According to a feature of the invention, the sheaves are driven through angular link members, such as flexible straps lying at acute angles to planes perpendicular to the axes of the sheaves to move the sheave cones axially relative to each other in response to torque.

A further object of the invention is to provide a variable speed drive in which the effective diameter of one of the sheaves and preferably of the driven sheave is controlled by a fluid pressure motor which is in turn controlled by a valve operating in response to the speed of the driven sheave.

According to a feature, the driven sheave may serve as a substantially constant speed driving source for the engine accessories and may provide a variable sheave section through which the fan is driven.

A still further object is to provide a variable speed drive in which an intermediate double sheave is controlled so that it tends to maintain a constant speed and in turn drives a sheave on the engine accessory shaft at an approximately constant speed.

The fan may be driven at variable speed through a variable sheave connected by a belt to a second sheave section on the accessory shaft.

The above and other objects and features of the invention will be more readily apparent from the following description when read in connection with the accompanying drawings, in which:

Figure 1 is a diagrammatic end elevation of an engine equipped with a variable speed accessory and fan drive embodying the invention;

Figure 2 is an axial section through the accessory shaft sheave taken on the line 2—2 of Figure 1;

Figure 3 is a partial section on the line 3—3 of Figure 2;

Figure 4 is a transverse section on the line 4—4 of Figure 5 through the driving sheave;

Figure 5 is a side elevation with parts in section of the driving sheave;

Figure 6 is a view similar to Figure 1 of an alternative variable speed drive assembly;

Figure 7 is a section on the line 7—7 of Figure 6 through the intermediate sheave; and Figure 8 is a section on the line 8—8 through the accessory drive sheave.

The variable speed drive, as shown in Figures 1 to 5, may be applied to a conventional V-type engine, indicated generally at 10, which includes a crank shaft 11, an accessory shaft 12 for driving various engine accessories, such as the generator, pumps and the like and a fan shaft 13 on which the usual cooling fan for the engine is mounted. In operation of the engine, the driving shaft 11 will drive the shaft 12 through a variable driving sheave 14 mounted on the driving shaft and a double variable sheave 15 on the accessory shaft. A belt 16 connects the driving sheave to one section of the double sheave 15 and the other section of this sheave is connected through a belt 17 to a variable sheave 18 on the fan shaft.

The fan sheave 18 may be of the type more particularly described and claimed in my Patent No. 2,637,308 or my Patent No. 2,658,400 to vary its effective diameter in response to engine temperature. This sheave is driven from the left-hand section of the double sheave 15, as seen in Figure 2, and as described hereinafter the double sheave 15 operates at an approximately constant speed so that variations in the fan speed are controlled solely by the variable sheave 18 and remain substantially unaffected by variations in the speed of the engine.

The double sheave 15, as shown in Figure 2, comprises a supporting shaft 19 on which a sleeve 21 is fixed. The shaft 19 is formed with a center bore connected through a connection 22 at its right end to a source of operating fluid pressure which in the embodiment illustrated may be an accumulator reservoir to provide vacuum for adjustment of the sheave. The left-hand section of the sheave which the belt 17 engages is constituted by a central double conical member 23 rigidly secured to the sleeve 21 and a conical end member 24 slidable axially on the sleeve 21 and urged toward the conical member 23 by springs 25. The belt 17 engages facing conical surfaces on the members 23 and 24 and may move in or out on these surfaces as the sheave 18 is adjusted to vary the fan speed.

At the right-hand side of the double conical member 23 a second conical member 26 is slidable on the sleeve 21 and is enclosed by a cover plate 27. The outer periphery of the member 26 is slidably sealed against the outer cylindrical flange of the cover 27 to form a piston slidable in the cover 27. A spring 28 normally urges the member 26 toward the member 23 to the maximum effective diameter position of the sheave section, as illustrated in dotted lines.

To shift the member 26 to the right against the spring 28 vacuum is connected to the space to the right of the member 26 through a bore 29 in the shaft 19 and sleeve 21. Supply of vacuum is controlled by a valve 31 which is normally shifted to the left by a spring 32 away from a valve seat communicating with the vacuum connection 22. The valve 31 is shown as a spool valve provided with sealing material on its ends so that when it is moved to the right against the spring 32 it will seat against the valve seat and close the vacuum connection to the interior of the cover 27. When the valve is shifted to the left, the vacuum connection is established around the right end of the valve spool between passages 22 and 29. When the valve is moved to the right to close passage 22 the space within the cover will be vented through the left end of the shaft 19 and through a filter 33 providing communication between the left end of the shaft and atmosphere.

Operation of the valve 31 is controlled in response to the speed of the shaft 19 which may be an accessory drive shaft and which is shown as an extension of the driving shaft for a generator indicated at 34. For this purpose, governor weights 35 are pivoted in a cover member 36 secured to the shaft 19 and are normally urged inward to the position shown by a spring 37 which may be adjusted through a screw 38 to vary the speed at which the sheave diameter will be changed. The governor is connected to the valve 31 through a rod 39 extending through the axial bore in shaft 19. As the speed of the shaft increases, the governor weights tend to fly out and shift the valve 31 to the right. This will restrict the connection between the vacuum source and the interior of the housing 27 to reduce the degree of vacuum in the housing and allow the sheave member 26 to shift to the left in response to the spring 28. At some predetermined speed the valve will seat completely, cutting off entirely the vacuum connection and at this time the sheave member 26 will move fully to the left to the dotted line position shown to provide maximum effective diameter and minimum drive ratio of the accessory shaft 19.

According to an important feature of the invention, the right-hand section of the double sheave 15 is also adjusted in response to torque loads so that it will tend to change its diameter in response to the high torque resulting from rapid acceleration in a positive or negative direction. For this purpose, the sheave members 23 and 26 are connected by an angular strut, shown as a strap 41 connected at its opposite ends to the members 23 and 26, respectively, and lying at an acute angle to a plane perpendicular to the axis of shaft 19. Since the sheave is driven through the belt 16, which engages both of the members 23 and 26, and since the members 26 can not only move axially, but can also rotate relative to the member 23, there is a tendency upon imposition of a high and rapid torque load to create a slipping of the belt relative to the member 23. Since the member 23 is directly connected to the accessory shaft and the member 26 is free to turn, a rapid positive acceleration will result in a turning of the member 26 in a forward direction relative to the member 23 which would be a clockwise direction as viewed from the left of Figure 2. This turning of the member 26 will place the strap 41 under tension and will tend to move the members 23 and 26 axially toward each other to increase the effective diameter of the sheave section and to reduce the tendency of the shaft 19 to follow the rapid acceleration of the belt 16. Negative acceleration, or deceleration, will place the strap 41 under compression to separate members 23 and 26. This decreases the effective sheave radius and tends to reduce the rate of deceleration. This feature, together with the features of the driving sheave, to be described more fully hereinafter, minimizes the effects of rapid engine acceleration.

The driving sheave 14, as best seen in Figures 4 and 5, comprises a sleeve 42 connected to the driving shaft 11 for rotation therewith. The sleeve is provided with a radially extending flange 43 having a flat driving surface which may be lined with friction material 44, as shown. A second sleeve 45 is rotatably mounted on the sleeve 42 and is formed with an outwardly extending flange 46 in frictional engagement with the friction material 44. The flange 46 is extended radially to provide a drum 47 having an internal cylindrical surface against which friction driving elements may engage.

As best seen in Figure 4, the driving flange 43 carries diametrically spaced pins 48 on each of which an arcuate friction shoe 49 is pivoted. The shoes 49 may carry friction lining material and are adapted to swing out about the pivots 48 into frictional engagement with the drum 47 to provide a friction drive between the sleeves 42 and 45. To urge the friction shoes outward springs 51 are provided acting substantially tangentially between enlarged end portions on each of the friction shoes 49 adjacent its pivotal mounting 48 and the free end of the opposite shoe 49 to spread the shoes into engagement with the drum.

In order to make the frictional engagement between the shoes and drum responsive to acceleration, an annular weight 52 is rotatably mounted on the sleeve 42 and may be loosely connected to the sleeve through a key 53 to limit the extent of its rotary movement. Each of the shoes 49 is provided with an extending finger 54 extending beyond its pivot radially within the opposite shoe and each extension 49 is pivotally connected to the weight 52 through a link 55. Preferably one of the pivotal connections of the link is through an elongated slot and a pin to provide a limited degree of lost motion so that the shoes can move into engagement with the drum even after the friction lining thereon has worn.

In operation, when the shaft 11 is subjected to a rapid acceleration in the counter-clockwise direction, as seen in Figure 4, the weight 52 will tend to lag behind the shaft so that it turns clockwise relative to the shaft and the sleeve 42. This turning motion will result in compressive force on the links 55 tending to swing the shoes about their pivotal mountings 48 radially inward away from the drum. This will reduce the frictional engagement between the shoes and the drum so that the sleeve 45 may slip more readily relative to the sleeve 42 and so that the driving sheave will tend not to accelerate at the same rate as the shaft. During rapid negative acceleration in the clockwise direction the weight 52 is held against turning on the shaft by the key 53 but the shoes tend to swing inward about their pivots 48 due to their own weight to reduce the frictional engagement. In this way, the effects of rapid accelerations of the shaft in either direction are partially cancelled so that wear on the parts and shock to the driven parts is reduced.

There will always be some friction drive between the two sleeves through the friction material 44. In order to maintain frictional engagement through this material, springs 56 may be provided acting between the flange 43 and a cover plate 57 secured to the drum 47. The strength of the springs 56 may be adjusted by design to produce at all times a predetermined minimum friction driving effect, but this friction driving effect may be relatively light so that the parts can slip relative to each other in response to the torque developed during rapid acceleration.

The flange 46 of the sleeve 45 carries a conical sheave member 58 which faces a second conical sheave member 59 mounted on the sleeve 45 for axial sliding and limited rotary movement. The member 59 is urged toward the member 58 by compression springs 61 toward the dotted line position in which the sheave has maximum effective diameter. To make the sheave further responsive to acceleration the sheave member 59 is connected to a housing element 62 which is secured to the sleeve 45 by an angular strap 63 similar to the strap 41 of Figures 1 to 3. The strap 63 extends in such a direction that when the sleeve 45 tends to accelerate rapidly in the forward direction the strap will be placed under tension and will tend to pull the sheave member 59 away from the member 58 to reduce the effective diameter of the sheave and when the sleeve tends to accelerate rapidly in the reverse direction the strap is placed under compression and tends to increase the effective sheave diameter. This action tends to minimize the effect of rapid accelerations of the driving shaft in either direction on the driven parts and to maintain a more steady constant speed drive. Air passages 65 provide a circulation of air due to centrifugal force to cool the friction parts.

In operation of the entire variable speed drive the diameter of the right-hand section of the double sheave 15 will tend to vary in response to the speed of the accessory shaft 19 in a direction to maintain the speed of the accessory shaft constant within predetermined limits. In a normal arrangement of this type the speed of the driven shaft will vary from approximately 1600 r.p.m. to approximately 2400 r.p.m. as the engine shaft speed varies from 1000 r.p.m. to 4000 r.p.m. The fan will be driven through the belt 16 under the control of the variable sheave 18 so that the fan is driven from a source whose speed is more nearly constant than that of the engine and so that the desired fan speed can be maintained more readily. Sudden acceleration of the engine in either direction is compensated by slipping of the friction drive in the driving sheave 14, as well as by variations in effective diameters of the driving and driven sheaves produced by operation of the angular links 41 and 63. In this way pinching of the belts due to rapid acceleration is minimized and the shock on the driven parts is minimized.

Where a closer speed control of the accessory shaft speed is desired, the arrangement shown in Figures 6 to 8 may be employed. These figures illustrate a drive applied to a conventional V-type engine indicated generally at 65 having a crank shaft 66, an accessory or generator shaft 67 and a fan drive shaft 68. The engine crank shaft 66 may carry a driving sheave 69 identical with the driving sheave 14 of Figures 1 to 5 and the fan shaft may carry a sheave 71 identical to the sheave 18 of Figures 1 to 5. In the construction of Figures 6 to 8, the driving sheave 69 is connected through a belt 72 to the left-hand section of a double intermediate sheave, indicated generally at 73. The right-hand section of the intermediate sheave 73 is connected through a belt 74 to the right-hand section of a double variable sheave 75 on the accessory shaft 67. The left-hand section of the double variable sheave 75 is connected through a belt 76 to the fan drive sheave 71.

The intermediate sheave 73, as best seen in Figure 7, comprises a fixed sleeve 77 on which a second sleeve 78 is rotatably mounted through bearings 79. The sleeve 78 fixedly carries a pair of conical end members 81 and 82 which have facing conical surfaces and an intermediate double cone member 83 is slidably mounted on the sleeve 78 between the end members 81 and 82. The member 83 is adapted to be moved axially of the sleeve 78 by means of pins 84 extending through slots in the sleeve 78 and carried by a ring 85 which is slidably and rotatably mounted on the fixed supporting sleeve 77. The ring 85 has an internal annular groove which receives the ends of a pin 86 carried by a rod 87 extending slidably into the fixed sleeve 77. As the rod 87 is shifted it will act through the pin 86, ring 85 and pins 84 to shift the double cone member 83 thereby to vary the effective diameters of the right and left hand sheave sections simultaneously in opposite directions.

To shift the rod 87 a fluid pressure motor is provided comprising a fixed cylindrical housing 88 on which the sleeve 77 may be secured and which receives a piston 89 secured to the end of the rod 87. Opposite ends of the cylindrical housing 88 may be connected to a source of vacuum, such as the engine manifold under the control of a valve 91. The valve 91, as shown, is a spool type valve whose spool 92 is shiftable to the left, as shown, to connect the left end of the cylinder to a vacuum source through a connection 93 and to the right to connect the right end of the cylinder to the vacuum source. The valve spool is shifted by a governor 94 which may be responsive to the speed of the intermediate sheave, but which is preferably responsive to the speed of the accessory shaft 67.

When the governor is stationary or turning at low speed, the governor spring 95 will shift the valve spool 92 to the right so that the rod 87 and double sheave member 83 will be shifted to the right. At this time, the left-hand pulley section engaged by the belt 72 is at minimum effective diameter and the right-hand pulley section engaged by the belt 74 is at maximum effective diameter. The speed of the driving shaft will therefore be twice multiplied and transmitted to the accessory shaft 67 to drive it at a high speed relative to the speed of the driving shaft. As the governor speed increases it will shift the valve spool to the left to connect the left end of the cylinder to the vacuum source and to shift the double sheave member 83 to the left toward the position shown. At this time, the left-hand section of the double sheave 73 will be at maximum effective diameter and the right-hand section will be at minimum effective diameter to drive the accessory shaft at a low speed relative to the speed of the driving sheave. Due to the double speed change the accessory shaft may be held at a more nearly constant speed, for example with a variation of from 1800 r.p.m. to 2200 r.p.m. as the engine varies between 500 r.p.m. and 4000 r.p.m.

The double sheave 75 in this construction may be simply a spring loaded sheave, as shown in Figure 8. As there illustrated, this sheave comprises a sleeve 96 secured to the accessory shaft 67 and having a double conical sheave element 97 rigidly fixed thereto. A pair of end conical elements 98 and 99 are slidable on the sleeve 96 and are urged toward the double sheave element 97 by springs 101. Additionally, each of the end elements 98 and 99 may be connected to the double sheave element through angular straps 102 which will tend to vary the sheave diameters in response to the high torque resulting from rapid acceleration to minimize acceleration effects. It will be understood that if desired similar straps could be employed in connection with the sections of the sheave 73 further to minimize the effects of acceleration.

This construction will function in substantially the same manner as that of Figures 1 to 5, except that because of the double speed variation produced through the intermediate sheave 73, a wider speed ratio change is possible and the shaft speed may be held more nearly constant.

While two embodiments of the invention have been shown and described herein, it will be understood that they are illustrative only and not to be taken as a definition of the scope of the invention, reference being had for this purpose to the appended claims.

What is claimed is:

1. In a variable speed drive, a sheave comprising axially movable parts having facing conical surfaces and mounted for rotation relative to each other, a belt engaging the conical surfaces, and a laterally flexible inextensible strap secured at its ends to the parts respectively and lying at an acute angle to a plane perpendicular to the axis of the sheave.

2. A variable speed drive comprising a driving sheave and a driven sheave each including axially movable parts having facing conical surfaces and mounted for limited turning relative to each other, driving and driven shafts connected to one of the parts of the respective sheaves, a belt engaging the conical surfaces of the sheaves, and means including inextensible link elements connecting the part of the sheaves and lying at acute angles to planes perpendicular to the shafts, the link element on the driving sheave tending to separate the parts to reduce the effective diameter of the driving sheave upon rapid positive acceleration of the driving shaft and the link element on the driven sheave tending to move the parts together to increase the effective diameter of the sheave upon rapid positive acceleration of the belt speed.

3. A variable speed drive comprising a driving sheave including facing conical parts mounted for relative axial and turning movement, a driving shaft connected to one of the parts, means connecting the parts to urge them axially away from each other upon rotation of said one part relative to the other in a forward direction, a driven sheave including facing conical parts mounted for relative axial and turning movement, a driven shaft connected to one of the last named parts, a belt engaging both of the sheaves, means connecting the parts of the driven sheave to urge them axially together upon rotation of the other of the parts in a forward direction relative to said one of the parts, a fluid motor connected to the parts of the driven sheave to urge them axially relative to each other, and means responsive to the speed of the driven sheave to control the motor.

4. The drive of claim 3 including frictionally engaged members connecting the driving shaft to said one part of the driving sheave, and a weight movable in response to acceleration of the driving shaft and connected to said members to urge them out of engagement with each other.

5. A variable speed drive for the fan and accessories of an internal combustion engine comprising a variable driving sheave adapted to be connected to the engine, a variable intermediate double sheave, a belt drivably connecting one section of the intermediate sheave to the driving sheave, a second variable double sheave adapted to be connected to an accessory shaft on the engine, a belt connecting the other section of the intermediate sheave to one section of the second sheave, a variable sheave adapted to be connected to a fan, and a belt connecting the other section of the second sheave to the last named sheave, both sections of the second sheave being resiliently urged to conditions of maximum effective diameter, the sections of the intermediate sheave being inversely variable, and means responsive to the speed of the intermediate sheave to vary the effective diameter of its sections in a direction tending to hold its speed constant.

6. The drive of claim 5 in which the last named means comprises a fluid pressure motor connected to the intermediate sheave simultaneously to vary the effective diameter of the sections thereof in opposite directions, and means responsive to the speed of the intermediate sheave to control the motor.

7. A variable speed drive comprising a driving sheave and a driven sheave each including axially movable parts having facing conical surfaces and mounted for limited turning relative to each other, driving and driven shafts connected to one of the parts of the respective sheaves, a belt engaging the conical surfaces of the sheaves, and inextensible link elements connecting the parts of the sheaves and lying at acute angles to planes perpendicular to the shafts, the link element on the driving sheave tending to move the parts together to increase the effective diameter of the driving sheave upon rapid negative acceleration of the driving shaft and the link element on the driven sheave tending to separate the parts to decrease the effective diameter of the sheave upon rapid negative acceleration of the belt speed.

References Cited in the file of this patent

UNITED STATES PATENTS

| | | |
|---|---|---|
| 2,308,868 | Durdin | Jan. 19, 1943 |
| 2,496,201 | Dodge | Jan. 31, 1950 |
| 2,678,566 | Oehrli | May 18, 1954 |
| 2,711,103 | Miner | June 21, 1955 |
| 2,755,078 | Chillson | July 17, 1956 |

FOREIGN PATENTS

| | | |
|---|---|---|
| 743,732 | Great Britain | Jan. 25, 1956 |